United States Patent [19]
Murillo

[11] 3,918,542
[45] Nov. 11, 1975

[54] AUXILIARY OIL DRIP PAN FOR A VEHICLE OR THE LIKE

[76] Inventor: Daniel Murillo, 6631 Greenleaf Drive, Citrus Heights, Calif. 95610

[22] Filed: Jan. 21, 1974

[21] Appl. No.: 435,101

[52] U.S. Cl. .............................................. 180/69.1
[51] Int. Cl.² ........................................ B62D 25/20
[58] Field of Search................... 180/69.1; 184/106

[56] References Cited
UNITED STATES PATENTS

| | | | |
|---|---|---|---|
| 1,874,585 | 8/1932 | Newcomb | 184/106 |
| 3,169,605 | 2/1965 | Ashmead | 180/69.1 X |
| 3,454,124 | 7/1969 | Niedek | 180/69.1 |
| 3,651,884 | 3/1972 | Dorries | 180/69.1 |
| 3,653,459 | 4/1972 | Andrews | 180/69.1 |

FOREIGN PATENTS OR APPLICATIONS 21,638    1908    United Kingdom............... 180/69.1

Primary Examiner—Kenneth H. Betts
Assistant Examiner—Milton L. Smith
Attorney, Agent, or Firm—Mark C. Jacobs

[57] ABSTRACT

An oil drip pan for use on the underside of a vehicle as an auxiliary pan for catching leaking or dripping oil from the preexisting vehicle oil pan. The oil pan includes means for securing the pan beneath the preexisting vehicle oil pan and is adapted to be mounted on most vehicles. The pan further includes means for absorbing most of the dripping oil and for guiding dripping or leaking oil to a particular location on the pan for subsequent drainage therefrom.

10 Claims, 6 Drawing Figures

AUXILIARY OIL DRIP PAN FOR A VEHICLE OR THE LIKE

BACKGROUND OF THE INVENTION

1. Field of the Invention

The invention relates to vehicle oil pans; and, more particularly, to an auxiliary oil pan for catching leaking or dripping oil beneath the preexisting oil pan of a vehicle or the like.

2. Description of the Prior Art

As is well known, all vehicles are equipped with an oil pan on the underside of the vehicle to catch dripping or leaking oil. As a general rule, such oil pans are sufficient to catch the relatively small amount of oil leaking from most cars. However, as the vehicle gets older, the vehicle leaks a progressively greater amount of oil. This results in unsightly driveways, roadways, and pavements or the like since the dripping oil stains the surface and is extremely black and dirty.

There thus exists a need for a relatively simple, inexpensive and easily installed means for supplementing the existing oil pan of a vehicle or the like. Such means should be capable of being mounted in a quick and easy manner on most vehicles.

SUMMARY OF THE INVENTION

It is an object to this invention to provide an auxiliary oil pan for use on a vehicle or the like.

It is a further object of this invention to provide such auxiliary oil pan which includes means for absorbing most of the oil leaking from the conventional or preexisting vehicle oil pan.

These and other objects are preferably accomplished by providing an oil drip pan which is adapted to supplement the preexisting vehicle oil pan and includes means for securing the oil drip pan in position beneath the conventional vehicle oil pan. Such oil pan includes means for absorbing most of the oil dripping from the conventional oil pan and guiding oil to a particular location on the pan where it may be subsequently drained therefrom.

DESCRIPTION OF THE PREFERRED EMBODIMENT

Figure 1:
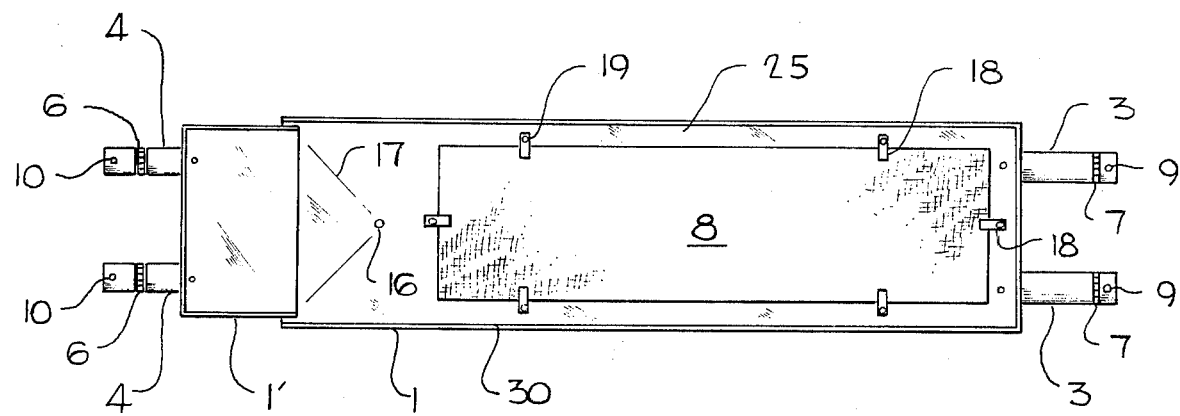
FIG. 1 is a top plan view of an auxiliary oil drip pan in accordance with the invention.

Referring now to FIGS. 1 through 5 of the drawing, an auxiliary oil drip pan 1 is disclosed which includes a generally flat elongated main body portion 2. Body portion 2 may be generally rectangular as shown and may also be comprised of two sections (not shown) which telescope together and may be locked in position in a generally leakproof manner so as to be longitudinally adjustable.

Figure 2:
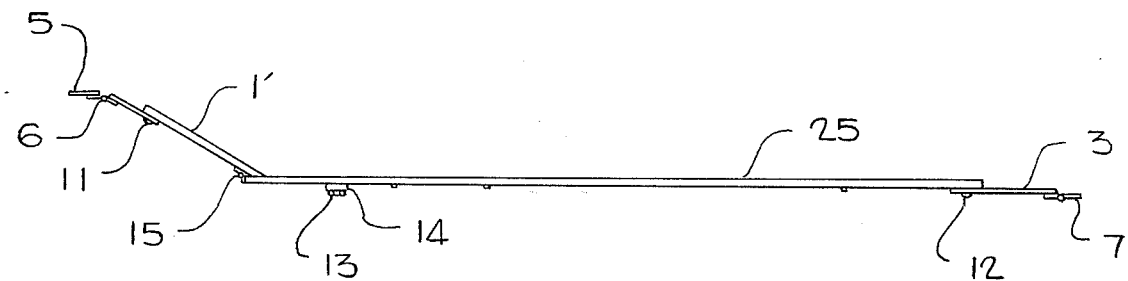
FIG. 2 is a side view of the oil drip pan of FIG. 1.

Pan 1 further includes an inclined portion 1' fixedly secured, via hinges 15 or the like (see FIG. 2), to one end of main body portion 1. A pair of brackets 4 are fixedly secured to the free end of inclined portion 1' via suitable machine screws 11 or the like. As can be seen in FIG. 2, brackets 4 lie generally in the same plane as inclined portion 1'. Finally, a pair of vehicle mounting brackets 5 are hingedly secured, via hinges 6 or the like, to the free ends of each bracket 4. These brackets 5 include suitable apertures 10 therein for bolting or otherwise securing pan 1 to the frame of the vehicle on which it is to be mounted as will be discussed further hereinbelow. It can also be seen in FIG. 2 that mounting brackets 5 lie generally in a horizontal plane, that is, a plane generally parallel to the plane of main body portion 2 as will be discussed further hereinbelow. It is to be understood that hinges 6 and 15 may be adjustable or otherwise locked in a fixed position to provide for the desired angularity of the various components of oil drip pan 1 as will also be discussed further hereinbelow.

The upper surface 25 of oil drip pan 1 may include scored or depressed lines 17 leading to an aperture 16 in oil drip pan 1 adjacent one end thereof. A substantial portion of the entire upper surface 25 of oil drip pan 1 may be covered with oil absorbing means, such as an absorbent pad 8 removably secured thereto by brackets 18 and machine screws 19. Any suitable absorbent material such as gauze or the like, may be used and it can readily be appreciated that pad 8 may be quickly and easily replaced, when desired.

The end of oil drip pan 1 opposite the end having inclined portion 1' secured thereto includes a second pair of vehicle mounting brackets 3 (also see FIG. 5) which are secured to the underside of pan 1 (see FIG. 1) by machine screws 12 and extend in a plane generally parallel thereto. Brackets 3 terminate in hinges 7 which may have apertures 9 therein for securing this end of oil drip pan 1 to the underside of a vehicle or the like.

Figure 3:
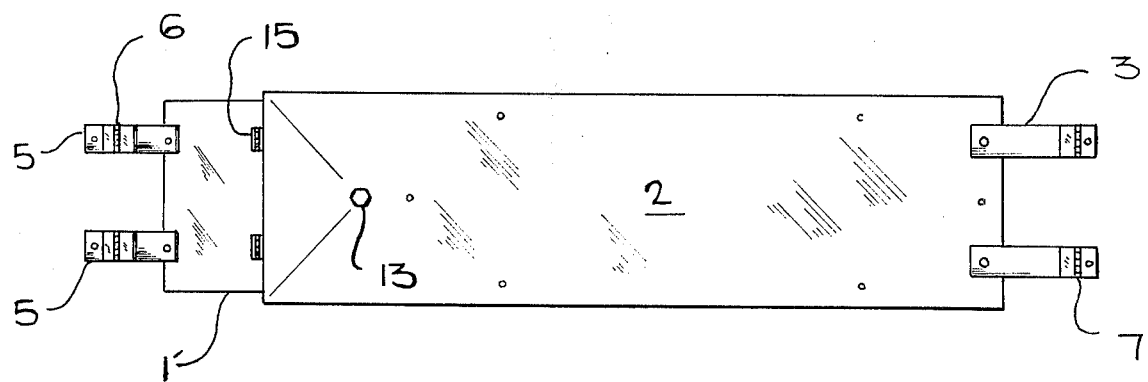
FIG. 3 is a bottom plan view of the oil drip pan of FIG. 1.
Figure 4:
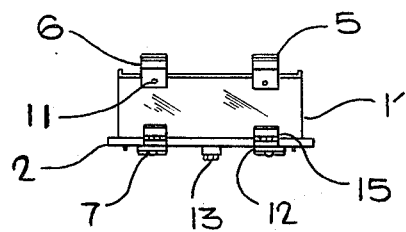
FIG. 4 is an end view of the oil drip pan of FIG. 1.
Figure 5:
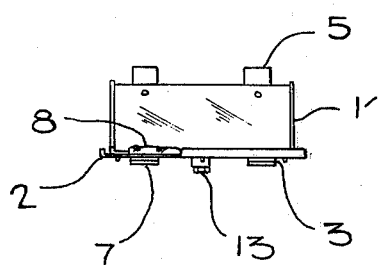
FIG. 5 is an opposite end view of the oil drip pan of FIG. 1 with parts broken away.

As can be seen in FIGS. 2 and 3, means may be provided for draining off surplus oil from pan 1. Such means may include aperture 16 in oil drip pan 1 which may be closed off in a leakproof manner by a plug 14 having a screw 13 therein and in fluid communication with aperture 16. This screw 13 need not be completely removable but at least capable of draining oil from pan 1 when loosened.

Finally, a peripheral lip 30 may extend about the periphery of the upper surface 25 of oil drip pan 1 for retaining oil on the pan. Such lip 30 may be about ½ to 1 inch in height.

Figure 6:
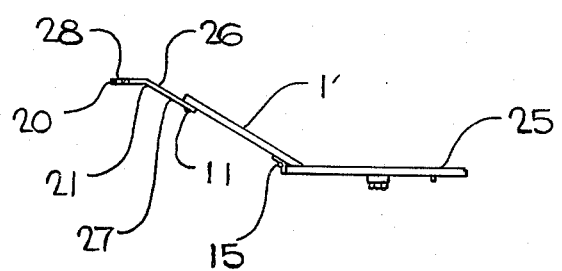
FIG. 6 is a view similar to a portion of the view of FIG. 2 showing a modification thereof.

As will be discussed further hereinbelow, pan 1 is adaptable to be quickly and easily mounted on most vehicles. If desired, brackets 4 and 5 may be replaced by a bracket 26 (FIG. 6) having a first inclined portion 27 secured to inclined portion 1' via machine screws 11, and a second generally horizontal portion 20 integral with first inclined portion 27. Bracket 26 may be scored or the like for easy bending at the intersection 21 of portions 20 and 27 to provide for the angular relationship between these portions 20 and 27. Portion 20 may also include apertures 28 therein for securing brackets 26 to the underside of a vehicle. It is understood that like numerals of FIG. 6 refer to like numerals of the embodiment of FIGS. 1 through 5; further, the comments hereinbelow relating to the oil drip pan of FIGS. 1 through 5 also relates to the oil drip pan of FIG. 6.

In operation the brackets 5 of oil drip pan 1 are secured via bolts, nuts or welding or the like (apertures 10 being used if bolted or the like) onto the frame of the vehicle on which it is desired to mount oil drip pan 1. Generally, this is the portion of the frame of the vehicle behind the radiator thereof.

The hinges or brackets 7 are mounted, also via bolts, nuts or welding or the like (apertures 9 being used if bolted) to another part of the frame of the vehicle (this is generally onto a cross-member on the vehicle frame adjacent the transmission thereof).

The hinges 6, 15, 7 (or scoring 21 as in the FIG. 6 embodiment) permit oil drip pan 1 to be mounted under the preexisting oil drip pan of a vehicle in a manner whereby main body portion 2 is generally horizontally mounted beneath the vehicle. In this position, any excess oil dripping from the preexisting oil drip pan of the vehicle will drip onto the upper surface 25 of pan 1. Most of this oil will be absorbed by pad 8 which can be replaced, if desired. Some of the oil may drip onto inclined portion 1' and then onto surface 25 or directly onto surface 25. Scoring 17 will guide any oil thereon to aperture 16. This oil, if not absorbed by pad 8, can be removed when desired by loosening or removing screw 13. The peripheral lip 30 aids in retaining oil on the upper surface 25 of pan 1.

It can readily be seen that the auxiliary oil drip pan disclosed herein may be quickly and easily mounted in position on most vehicles. Suitable mounting apertures or the like may be drilled in the vehicle frame. if not welded thereto. Of course, pan 1 may be telescopingly adjustable as discussed hereinabove.

The length of pan 1 may also be varied depending upon the vehicle in which it is desired to be installed. The oil drip pan 1 disclosed hereinabove may be mounted on most vehicles or made adaptable thereto by utilizing suitable hinges, brackets, etc. Further, the oil drip pan disclosed herein may absorb a large amount of oil that bypasses the preexisting oil drip pan of the vehicle on which it is installed. If an excessive amount of oil is dripping from the vehicle, the vehicle should be repaired. Any suitable materials may be used, such as plastics or metals or the like. Plastics are particularly desirable if scoring or the like is used to render the brackets adjustable.

It can be seen that the foregoing is exemplary of the teachings of the invention and modifications thereof may readily occur to one skilled in the art. Accordingly, the techniques of the invention are to be limited only by the claims appended hereto.

I claim as my invention:

1. An auxiliary oil drip pan for use under the preexisting oil drip pan of a vehicle or the like comprising:
   a first generally horizontal substantially flat main body portion having an upper and a lower surface;
   absorbent means for absorbing oil disposed on a substantial portion of said upper surface:
   a second inclined portion adjustably secured to one end of said main body portion and inclined upwardly in a direction leading away from said main body portion; the secured end of said inclined portion being in a partially superposed overlapping relationship with the main body portion;
   first mounting bracket means secured to the other end of said main body portion, said first mounting bracket means being angularly adjustable with respect to said main body portion:
   second mounting bracket means secured to said inclined portion and being angularly adjustable with respect to said inclined portion,
   oil directing means comprising depressed portions on the upper surface of said main body portion for directing oil to an oil removing means,
   and oil removing means associated with said upper and lower surfaces of said body portion for selectively removing oil disposed on said upper surface and comprising at least one aperture existing through said main body portion, and plug means sealing off said aperture in a leakproof manner.

2. The oil drip pan of claim 1 wherein said absorbent means is an absorbent pad removably secured to said upper surface.

3. The oil drip pan of claim 1 wherein a peripheral lip extends upwardly from said main body portion along a substantial portion of the periphery thereof.

4. The oil drip pan of claim 1 wherein said second mounting bracket means includes at least a pair of brackets, each of said brackets including a first portion lying generally in the same plane as said inclined portion and fixedly secured thereto, and a second portion angularly adjustably secured to said first portion and lying generally in a plane parallel to said main body portion.

5. The oil drip pan of claim 4 wherein said first and second portions are of an integral piece and said first portion is adjustably secured to said second portion by scoring therebetween.

6. The oil drip pan of claim 4 wherein said first portion is adjustably secured to said second portion by a hinge.

7. The oil drip pan of claim 4 wherein said first mounting bracket means includes at least a pair of brackets, each of said brackets including a first portion fixedly secured to said main body portion and lying generally in the same plane, and a second portion angularly adjustably secured to said last-mentioned first portion.

8. The oil drip pan of claim 4 wherein a peripheral lip extends upeardly from said main body portion along a substantial portion of the periphery thereof.

9. The oil drip pan of claim 1 wherein said first body portion is adjustably secured to said second body portion by at least one hinge.

10. The oil drip pan of claim 1 wherein said first mounting bracket means includes at least a pair of brackets, each of said brackets including a first portion fixedly secured to said main body portion and lying generally in the same plane, and a second portion angularly adjustably secured to said last-mentioned first portion.

* * * * *